United States Patent
Hohmann

(10) Patent No.: US 7,434,596 B2
(45) Date of Patent: Oct. 14, 2008

(54) NON-RETURN VALVE FOR A PUMP

(75) Inventor: Marc Hohmann, Marktheidenfeld (DE)

(73) Assignee: Siemens Aktiengesellschaft, Munich (DE)

( * ) Notice: Subject to any disclaimer, the term of this patent is extended or adjusted under 35 U.S.C. 154(b) by 882 days.

(21) Appl. No.: 10/785,632

(22) Filed: Feb. 24, 2004

(65) Prior Publication Data

US 2004/0163715 A1     Aug. 26, 2004

Related U.S. Application Data

(63) Continuation of application No. PCT/DE02/03166, filed on Aug. 29, 2002.

(30) Foreign Application Priority Data

Aug. 31, 2001   (DE)   ................................. 101 42 609

(51) Int. Cl.
  *F16K 15/04*   (2006.01)
(52) U.S. Cl. ............................. 137/533.19; 137/533.13
(58) Field of Classification Search ............ 137/533.11, 137/533.13, 533.15, 533.19
  See application file for complete search history.

(56) References Cited

U.S. PATENT DOCUMENTS

| | | | |
|---|---|---|---|
| 620,676 A | 3/1899 | Sanderson | 137/543 |
| 784,534 A | 3/1905 | Bassett | 137/543 |
| 1,001,246 A * | 8/1911 | Budlong | 137/533.13 |
| 1,086,549 A | 2/1914 | Miller | 137/543 |
| 1,657,404 A * | 1/1928 | Kuehne | 137/533.19 |
| 1,867,585 A | 7/1932 | Moore | |
| 2,081,462 A * | 5/1937 | McClure | 137/533.11 |
| 2,091,058 A * | 8/1937 | Thompson et al. | 137/533.13 |
| 2,401,856 A * | 6/1946 | Brock | 137/533.13 |
| 2,591,174 A * | 4/1952 | Martin | 137/533.13 |
| 2,649,277 A | 8/1953 | Blackford | 251/144 |
| 2,899,974 A * | 8/1959 | Gratzmuller | 137/533.11 |
| 2,973,008 A | 2/1961 | Klose | 137/543 |
| 3,474,808 A | 10/1969 | Elliott | 137/543 |
| 3,491,790 A * | 1/1970 | Sanford | 137/533.11 |
| 3,584,644 A | 6/1971 | Morken | 137/426 |
| 3,610,276 A | 10/1971 | Seelman et al. | 137/514.5 |

(Continued)

FOREIGN PATENT DOCUMENTS

DE   43 21 800 A1   1/1994

(Continued)

OTHER PUBLICATIONS

PCT/DE02/03166 International Search Report, 7 pages, mailed Jul. 17, 2003.

(Continued)

*Primary Examiner*—John Rivell
(74) *Attorney, Agent, or Firm*—Baker Botts L.L.P.

(57) ABSTRACT

The invention relates to a non-return valve for a pump, in particular a fuel pump, with a housing (2) in which a valve seat (3) is embodied, a closing body (4) and a cage element. The closing body (4) is arranged within the cage element, whereby the cage body is embodied in two pieces. The cage element comprises a guide element (5) and a stop element (6), such that a functional separation of the regions of the cage element with various functions is possible.

16 Claims, 5 Drawing Sheets

U.S. PATENT DOCUMENTS

| | | | |
|---|---|---|---|
| 3,810,716 A | 5/1974 | Abrahams et al. | 417/313 |
| 3,995,658 A | 12/1976 | Hagar | 137/543 |
| 4,187,059 A | 2/1980 | Parker et al. | 417/454 |
| 4,203,466 A | 5/1980 | Hager | 137/543 |
| 4,391,283 A | 7/1983 | Sharpless et al. | 128/725 |
| 4,535,808 A | 8/1985 | Johanson et al. | 137/543 |
| 4,646,783 A * | 3/1987 | Bazan et al. | 137/533.11 |
| 4,766,929 A | 8/1988 | Yaindl | 137/514.3 |
| 4,768,932 A | 9/1988 | Geberth, Jr. | 417/552 |
| 4,862,913 A | 9/1989 | Wildfang | 137/543 |
| 5,195,552 A | 3/1993 | Nehm | 137/269 |
| 5,226,799 A | 7/1993 | Raghavan et al. | 417/53 |
| 5,370,150 A | 12/1994 | Nehm | 137/454.2 |
| 5,507,312 A | 4/1996 | Dillman | 137/533.15 |
| 5,636,975 A | 6/1997 | Tiffany et al. | 417/454 |
| 5,921,276 A | 7/1999 | Lam et al. | 137/514.7 |
| 5,967,180 A * | 10/1999 | Yates, III | 137/533.13 |

FOREIGN PATENT DOCUMENTS

| | | |
|---|---|---|
| DE | 43 25 688 A1 | 2/1994 |
| DE | 197 41 249 A1 | 3/1999 |
| DE | 197 44 577 A1 | 4/1999 |
| GB | 409028 | 4/1934 |
| GB | 744858 | 2/1956 |

OTHER PUBLICATIONS

PCT/DE02/04752 International Search Report, 7 pages, mailed Apr. 20, 2004.

* cited by examiner

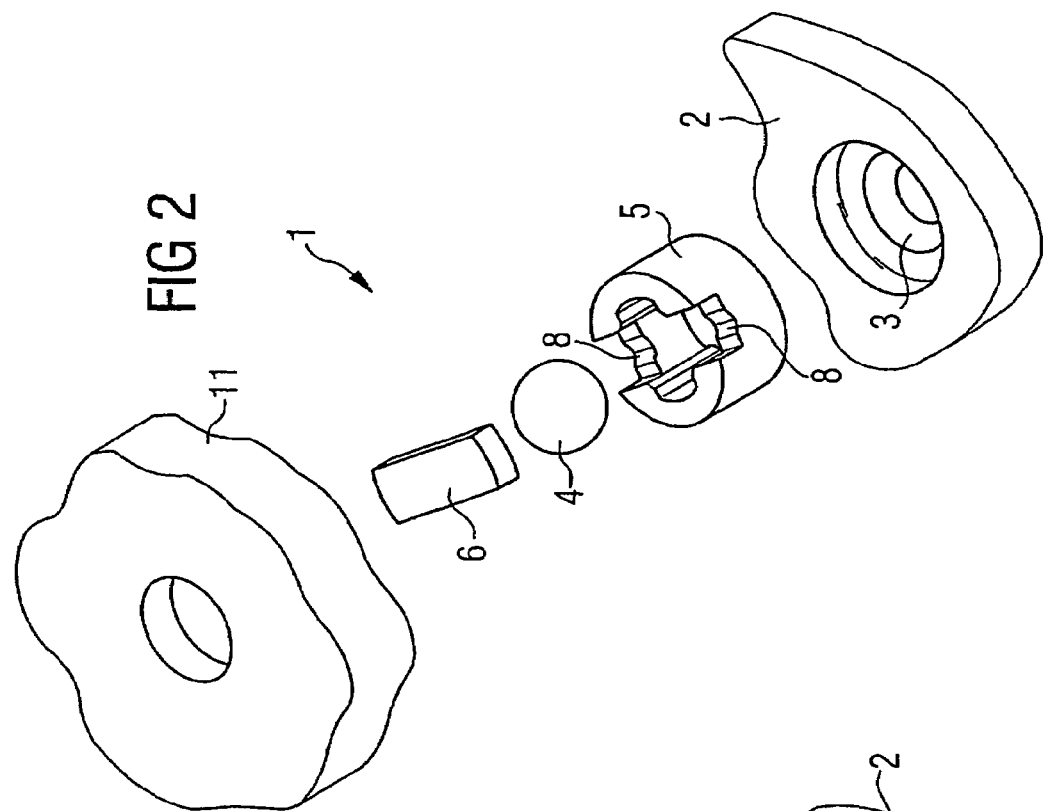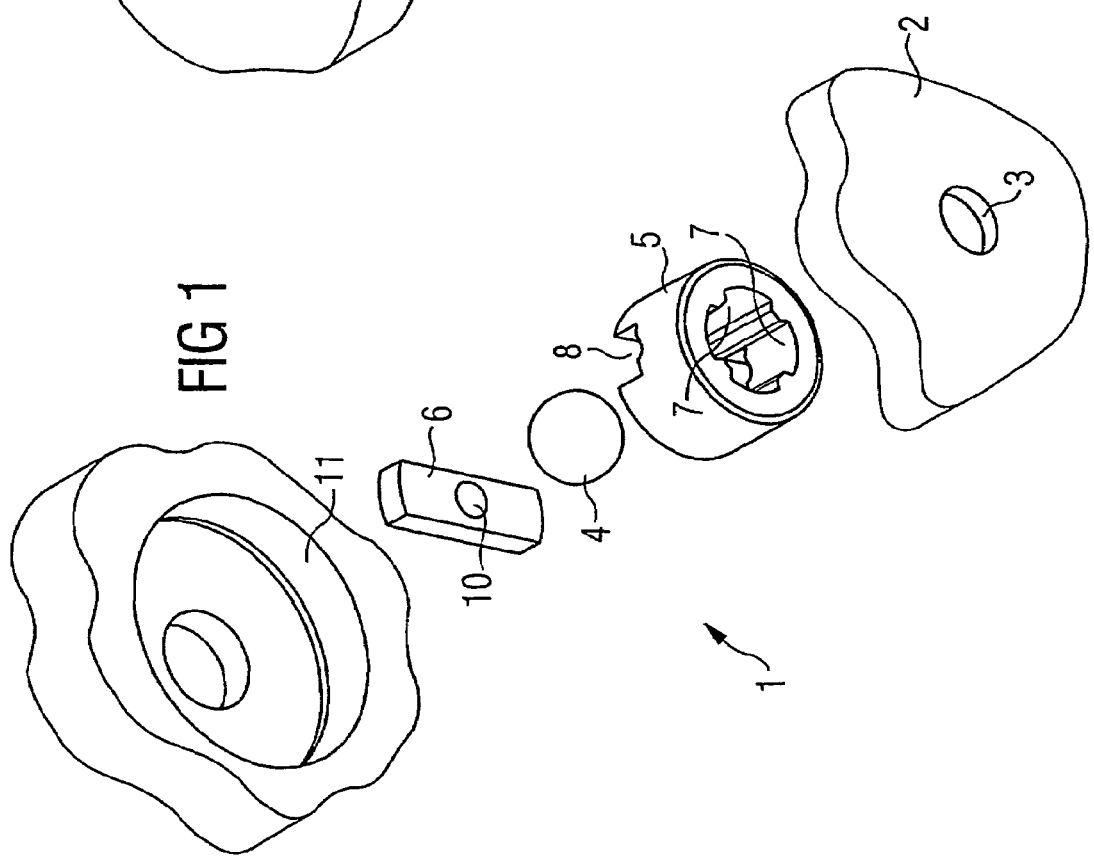

NON-RETURN VALVE FOR A PUMP

CROSS REFERENCE TO RELATED APPLICATION

This application is a continuation of copending International Application No. PCT/DE02/03166 filed Aug. 29, 2002 which designates the United States, and claims priority to German application no. 101 42 609.7 filed Aug. 31, 2001.

TECHNICAL FIELD OF THE INVENTION

The present invention relates to a non-return valve for a pump and in particular a high-pressure non-return valve for a fuel pump of a common rail injection system.

DESCRIPTION OF THE RELATED ART

Non-return valves for pumps are known in different embodiments. An example of a known non-return valve is illustrated in FIG. 12. As shown in FIG. 12, the non-return valve comprises a receptacle 2 having a valve seat 3 and also incorporates a closing body 4 and a cage element 16. The closing body 4 is disposed inside the claw-shaped cage element 16 and can move in axial direction in the non-return valve. The closing body 4 can assume two positions, namely a first position in which it sits on the valve seat 3, thereby preventing fluid from flowing, and a second position in which it lies against the base (stop region) of the cage element 16 and allows valve flow in axial direction through the openings between the individual guide regions of the cage element. The cage element 16 additionally rests against a mating surface 11.

In the known non-return valves, the cage element combines the functions of closing body guide, valve overflow and closing body stop in one component. Cage elements of this kind are manufactured e.g. by stamping and subsequent deep drawing or by turning. Because of the bending radii between the stop region and the guide regions, breakages often occur, particularly during use in high-pressure pumps for common rail injection systems at high speeds because of the high pressures.

SUMMARY OF THE INVENTION

The object of the present invention is therefore to provide a non-return valve, particularly for fuel pumps for common rail injection systems, which is of simple design, is easy and inexpensive to manufacture and has a long service life even under high loading conditions.

This object can be achieved by a non-return valve for a pump, comprising a receptacle in which a valve seat is implemented, a closing body and a cage element in which the closing body is disposed, whereby the cage element is bipartite, comprising a guide element and a stop element and the guide element is made from a material having a lower modulus of elasticity than a material of the stop element.

The guide element can be made from plastic or aluminum and the stop element from steel. The guide element can be implemented as a sleeve and has at least one overflow passage on its inner circumference. The stop element can be press-fit into the guide element. A spherical indentation can be implemented in the stop element. The stop element may have two, three or four areas of connection to the guide element. In the assembled state, the stop element may adjoin a mating surface which is implemented on a valve housing. Grooves to accommodate the stop element can be implemented in the guide element. Recesses for ensuring pressure compensation can be implemented in the grooves. Furthermore, the non-return valve can be preferably used in a high-pressure pump for delivering fuel for a common rail injection system.

The non-return valve according to the invention for a pump, in particular a high-pressure fuel pump, can meet the requirements both in terms of stroke limiting for the closing body and tight tolerances for the closing body guide, the cage element of the non-return valve according to the invention being implemented in two parts comprising a guide element and a stop element. By this means the stop element can be optimized in respect of the impulsive forces caused by the closing body when the valve opens, and the guide element can be optimized in respect of the guiding of the closing body between its open and closed positions. The guide element is not therefore loaded by the opening impulse exerted on the stop element by the closing body. The non-return valve according to the invention can therefore have an improved service life. Consequently, by means of the bipartite design of the cage element, a division of the different functions assumed by the cage element is achieved, so that the individual components of the cage element can be optimized in respect of their requirements, thereby enabling the problems arising in the prior art particularly at high pump speeds and high pressures to be avoided by the high-pressure non-return valve according to the invention.

The guide element and the stop element are preferably made of different materials, the material for the guide element having a lower modulus of elasticity than that of the stop element. It is particularly preferred that the guide element is made from plastic or aluminum and the stop element from steel, e.g. heat-treatable or case-hardening steel. By manufacturing from plastic, the guide element can, for example, be injection-molded and therefore have very tight tolerances in respect of the guiding of the closing body, without re-machining of the guide element being necessary. By means of this improved guiding of the closing body, in particular more precise seating on the sealing cone of the valve is achieved, the material for the guide element preferably being selected with regard to ease of press-fitting into a housing or similar, and with regard to a high degree of sliding wear resistance. The material for the stop element is preferably selected with regard to high impact wear resistance and high fatigue strength.

To obtain a particularly compact and long-lifetime cage element, the guide element is preferably implemented as a sleeve and has at least one overflow passage.

In order to enable the cage element to be pre-assembled, the guide element and the stop element are preferable press-fit together.

To prevent point loading of the stop element, the stop element preferably has a spherical indentation, accurate seating of the closing body on the indentation also being achieved by the high guiding accuracy of the guide element.

The stop element advantageously has two, three or four regions of connection to the guide element. This enables the stop element to be implemented e.g. as a simple bar element, as a star-shaped element or as a cross-shaped element.

In the assembled state, the stop element preferably adjoins a mating surface formed on the valve housing, thereby enabling the valve according to the invention to be produced as a completely pre-assembled component. However, it is also possible for the mating surface to be formed directly by a shoulder in the fluid line in which the valve is disposed.

In order to allow particularly easy assembly, grooves accommodating the connecting regions of the stop element are preferably implemented on the guiding element, the stop element being insertable e.g. by press-fitting or gluing. It is additionally possible for the stop element also to be injected into the guide element e.g. during manufacture by injection molding.

In a particularly preferred embodiment, recesses ensuring pressure compensation are formed in the grooves for accommodating the stop element.

The non-return valve according to the invention is used particularly for high-pressure fuel pumps in which very exacting requirements are placed on the individual components because of the high pressures. The non-return valve according to the invention can meet these exacting requirements, is easy and inexpensive to manufacture and assemble and has a long service life.

BRIEF DESCRIPTION OF THE DRAWINGS

The invention will now be described in greater detail with reference to preferred embodiments and the accompanying drawings in which:

FIG. 1 shows a perspective exploded view of a non-return valve according to a first embodiment of the present invention;

FIG. 2 shows a perspective exploded view from another direction of the non-return valve depicted in FIG. 1;

FIG. 4b shows a side view of the guide element shown in FIG. 4a;

FIG. 5b shows a side view of the stop element shown in FIG. 5a;

DETAILED DESCRIPTION OF THE PREFERRED EMBODIMENTS

Figure 3:
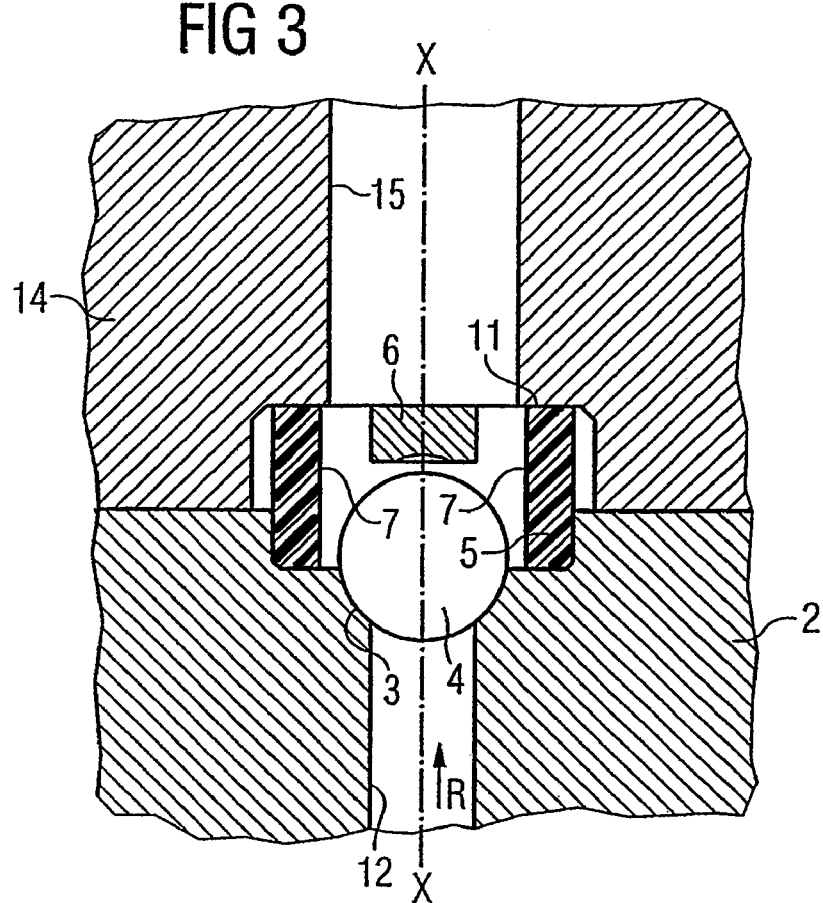
FIG. 3 shows a sectional view of the non-return valve shown in FIGS. 1 and 2 in the assembled state.

A non-return valve according to a first embodiment of the present invention will now be described with reference to FIGS. 1 to 5b.

As shown in FIGS. 1 and 2, the inventive high-pressure non-return valve 1 according to the first embodiment comprises a receptacle 2 in which a valve seat 3 is implemented at the end of a line 12. As shown in FIG. 2, the valve seat 3 is implemented as a sealing cone. The valve 1 additionally comprises a two-part cage element consisting of a guide element 5 and a stop element 6. The stop element 6 is inserted in grooves 8 on the guide element 5.

Figure 4A:
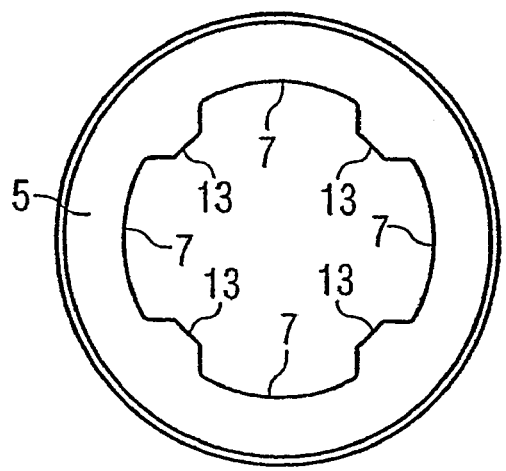
FIG. 4a shows a view from below of the guide element of the non-return valve of the first embodiment.

The guide element 5 is basically cylindrical in shape and has on its inside, as shown in FIG. 4a, four overflow passages 7 and four guide regions 13, the guide regions 13 being used to guide the closing body 4 implemented as a ball. The overflow regions 7 allow fluid to flow through the non-return valve in axial direction. As can be seen in particular from FIGS. 1 and 5a, a spherical indentation 10 is implemented in the stop element 6. The spherical indentation 10 can be formed e.g. by a cylindrical depression in the stop element 6. The spherical indentation 10 prevents only a point contact from occurring between the closing body 4 and the stop element 6 when the valve 1 is opened, which would result in particularly high loading of the stop element 6.

In addition, as can be seen in particular from FIGS. 1 and 3, a shoulder providing a mating surface 11 for the cage element is implemented on a component 14 having a line 15.

Figure 4B:
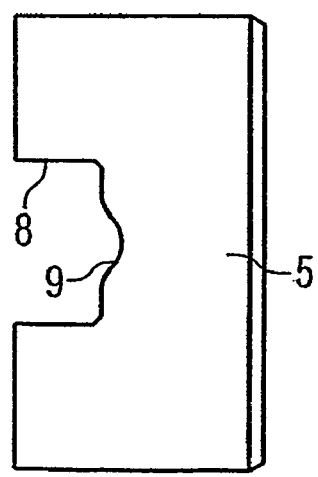
Figure 5A:
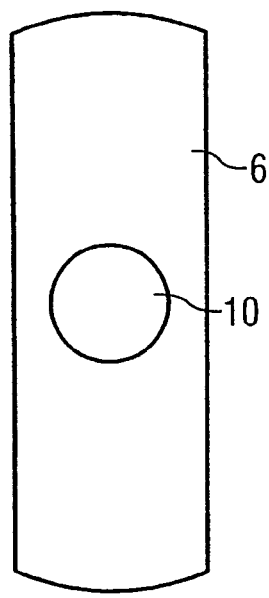
FIG. 5a shows a view from below of the stop element according to the first embodiment.
Figure 5B:
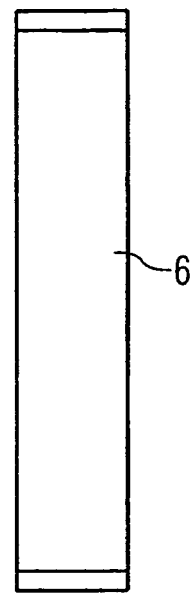

As can be seen in particular from FIG. 4b, in the grooves 8 for mounting the stop element 6 there is formed a depression or recess 9 which, in the assembled state of the stop element 6 on the guide element 5, provides pressure compensation between the two overflow passages 7 partially covered by the stop element 6. This enables any flow resistance of the non-return valve to be reduced.

The guide element 5 and the stop element 6 are manufactured from different materials. The guide element 5 is made of plastic so that no machining is necessary for this component. This enables in particular tight tolerances to be met, so that better guiding of the closing body 4 is possible compared to the prior art. This makes it possible to achieve more precise seating on the sealing cone 3 in the receptacle 2 when the valve is closed and on the spherical indentation 10 in the stop element 6 when the valve is opened. The height of the sleeve-shaped guide element 5 is such that the closing body 4 is guided continuously between the two end positions of the closing body. The stop element 6 is made e.g. of steel and can be manufactured very inexpensively by stamping.

The overflow passages 7 therefore provide a sufficient rate of flow through the valve 1 in axial direction X-X of the valve. The flow direction is indicated in FIG. 3 by means of an arrow R.

Figure 6:
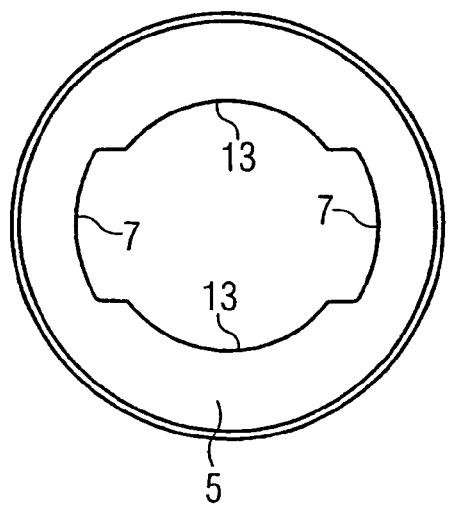
FIG. 6 shows a view from below of a guide element according to a second embodiment of the present invention.

FIG. 6 depicts a guide element according to a second embodiment of the present invention, the same or functionally identical parts being designated by the same reference characters as in the first embodiment.

As shown in FIG. 6, in contrast to the guide element of the first embodiment, the guide element of the second embodiment is provided with only two overflow passages 7, said overflow passages 7 being disposed opposite one another. In addition, only two guide regions 13 are implemented which, however, each extend over approximately a quarter of the inner circumference of the sleeve-shaped guide element 5.

Figure 7:
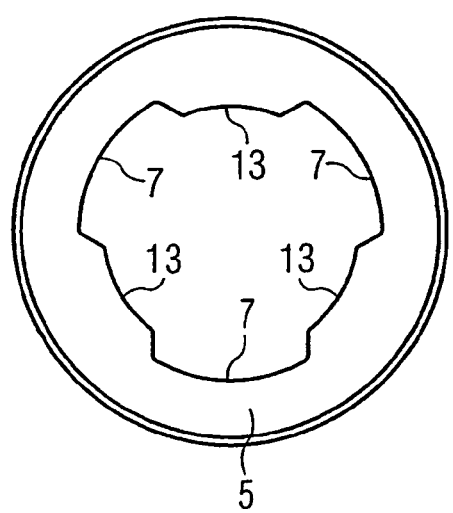
FIG. 7 shows a view from below of a guide element according to a third embodiment of the present invention.

FIG. 7 depicts a guide element 5 according to a third embodiment of the present invention, the same or functionally identical parts again being designated by the same reference characters as in the first embodiment. As shown in FIG. 7, the guide element 5 according to the third embodiment has three overflow passages 7 and three guide regions 13, the overflow passages 7 and guide regions 13 being disposed equidistant from one another in each case.

Figure 8:
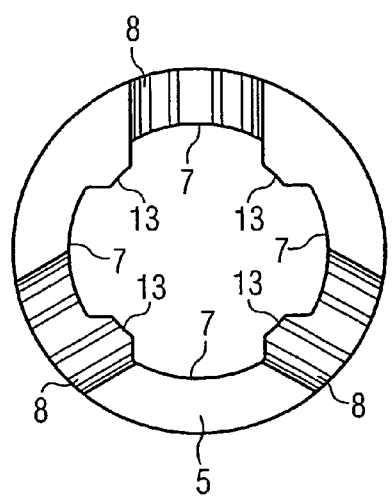
FIG. 8 shows a plan view of a guide element according to a fourth embodiment of the present invention.
Figure 9:
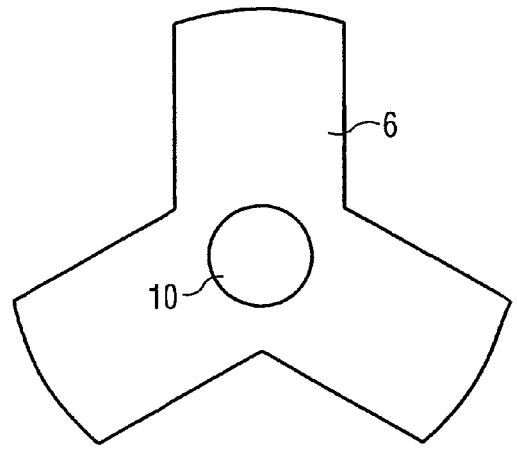
FIG. 9 shows a view from below of a stop element for the guide element shown in FIG. 8.

FIGS. 8 and 9 depict a guide element and a stop element according to a fourth embodiment of the present invention, identical parts being designated by the same reference characters.

As shown in FIG. 8, the guide element 5, in contrast to the first embodiment, has three grooves 8 into which a star-shaped stop element 6 shown in FIG. 9 can be press-fit, the three connecting regions of the stop element 6 each being disposed 120° apart, as shown in FIG. 9, and a press-fit being provided between the stop element 6 and the guide element 5.

Figure 10:
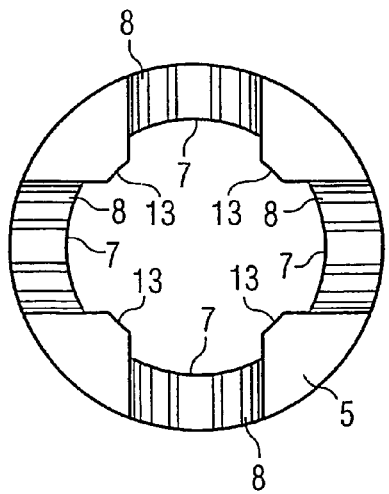
FIG. 10 shows a plan view of a guide element according to a fifth embodiment of the present invention.
Figure 11:
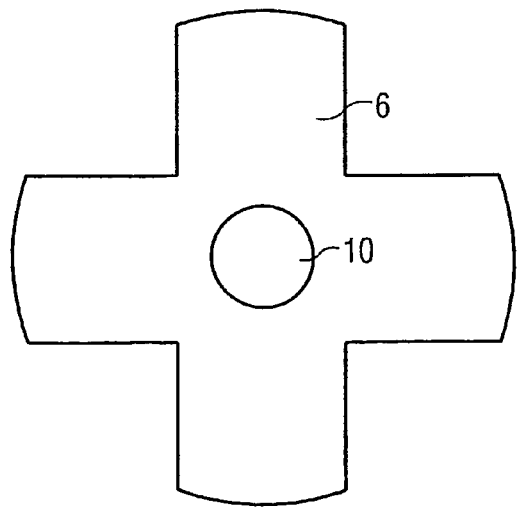
FIG. 11 shows a view from below of a stop element for the guide element shown in FIG. 10.
Figure 12:
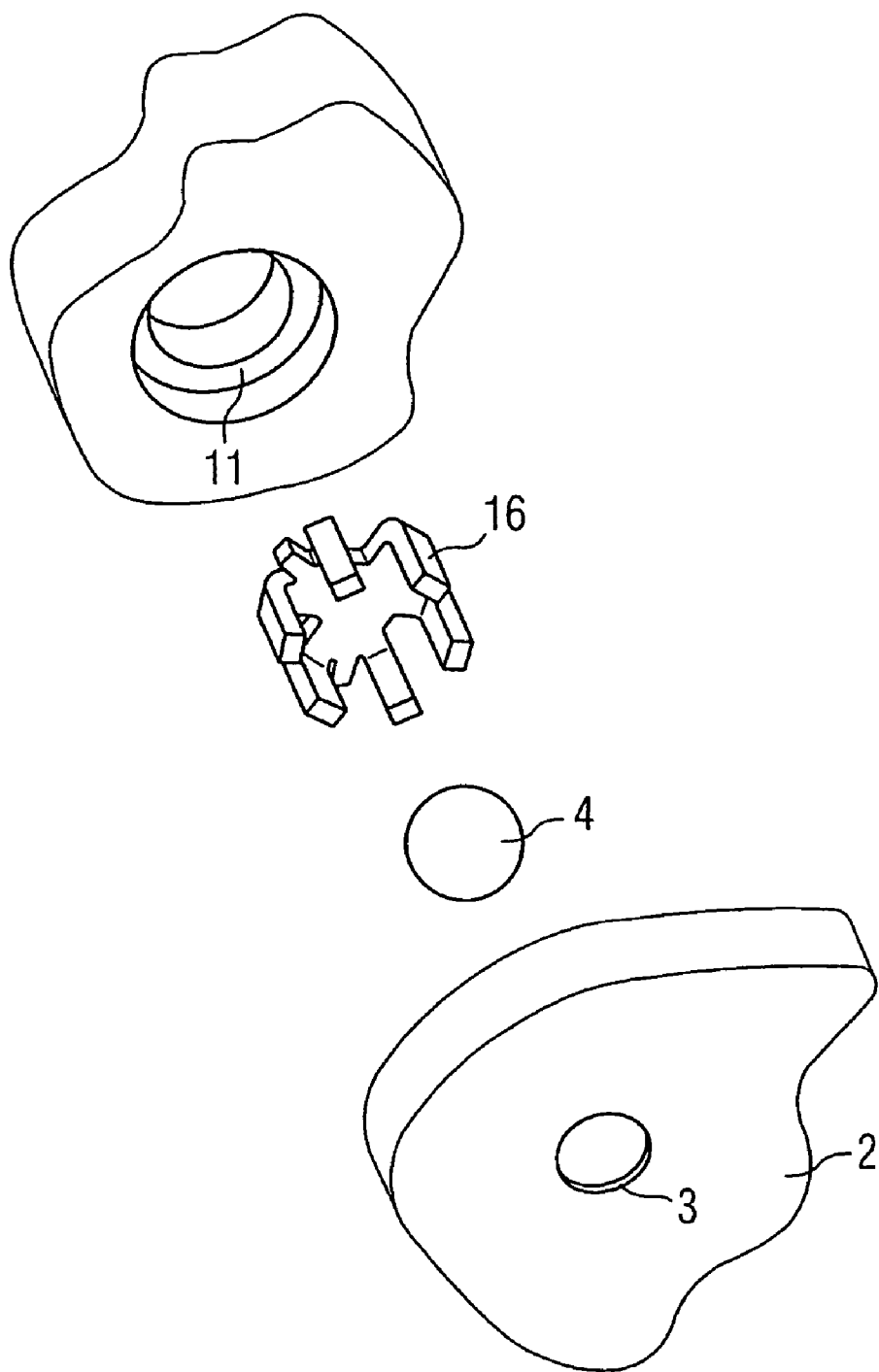
FIG. 12 shows a perspective exploded view of a non-return valve according to the prior art.

FIGS. 10 and 11 show a guide element and a stop element according to a fifth embodiment of the present invention, identical parts being designated by the same reference characters.

In the fifth embodiment, in contrast to the fourth embodiment, four grooves 8 are provided so that four connecting regions are also implemented on the stop element 6. The stop element 6 therefore has an essentially cruciform shape.

The present invention therefore relates to a non-return valve for a pump, in particular a fuel pump, having a receptacle 2, in which a valve seat 3 is implemented, a closing body 4 and a cage element. The closing body 4 is disposed in the cage element, said cage element being implemented in two parts. The cage element comprises a guide element 5 and a stop element 6, thereby providing functional separation of the cage element regions having different functions.

The present invention is not limited to the embodiments described. Various changes and modifications may be made without departing from the scope of the invention.

I claim:

1. A non-return valve for a pump, comprising a receptacle in which a valve seat is implemented, a closing body and a cage element in which the closing body is disposed, whereby the cage element is bipartite, comprising a guide element and a stop element and the guide element is made from a material having a lower modulus of elasticity than a material of the stop element, wherein grooves to accommodate the stop element are implemented in the guide element, and recesses for ensuring pressure compensation are implemented in the grooves.

2. The non-return valve according to claim 1, wherein the guide element is made from plastic or aluminum and the stop element from steel.

3. The non-return valve according to claim 1, wherein the guide element is implemented as a sleeve and has at least one overflow passage on its inner circumference.

4. The non-return valve according to claim 1, wherein the stop element is press-fit into the guide element.

5. The non-return valve according to claim 1, wherein a spherical indentation is implemented in the stop element.

6. The non-return valve according to claim 1, wherein the stop element has two, three or four areas of connection to the guide element.

7. The non-return valve according to claim 1, wherein, in the assembled state, the stop element adjoins a mating surface which is implemented on a valve housing.

8. A method for delivering fuel for a common rail injection system comprising the steps of:
   providing a high-pressure pump for delivering fuel for a common rail injection system;
   providing a non-return valve for the high pressure pump, wherein the non-return valve comprises a receptacle in which a valve seat is implemented, a closing body and a cage element in which the closing body is disposed, whereby the cage element is bipartite, comprising a guide element and a stop element and the guide element is made from a material having a lower modulus of elasticity than a material of the stop element, wherein grooves to accommodate the stop element are implemented in the guide element and recesses for ensuring pressure compensation are implemented in the grooves.

9. The method according to claim 8, wherein the guide element is made from plastic or aluminum and the stop element from steel.

10. The method according to claim 8, wherein the guide element is implemented as a sleeve and has at least one overflow passage on its inner circumference.

11. The method according to claim 8, wherein the stop element is press-fit into the guide element.

12. The method according to claim 8, wherein a spherical indentation is implemented in the stop element.

13. The method according to claim 8, wherein the stop element has two, three or four areas of connection to the guide element.

14. The method according to claim 8, wherein, in the assembled state, the stop element adjoins a mating surface which is implemented on a valve housing.

15. A non-return valve for a pump, comprising a receptacle in which a valve seat is implemented, a closing body and a cage element in which the closing body is disposed, whereby the cage element is bipartite, comprising a guide element and a stop element, wherein recesses for ensuring pressure compensation are implemented in grooves.

16. The non-return valve according to claim 15, wherein the guide element is made from a material having a lower modulus of elasticity than a material of the stop element.

* * * * *